No. 804,675. PATENTED NOV. 14, 1905.
G. ROBERTS.
HOP SPRAYER.
APPLICATION FILED OCT. 16, 1903.

2 SHEETS—SHEET 1.

WITNESSES:
Frank B. Cole

George Roberts INVENTOR

BY
G. W. Bullard ATTORNEY

No. 804,675. PATENTED NOV. 14, 1905.
G. ROBERTS.
HOP SPRAYER.
APPLICATION FILED OCT. 16, 1903.
2 SHEETS—SHEET 2.
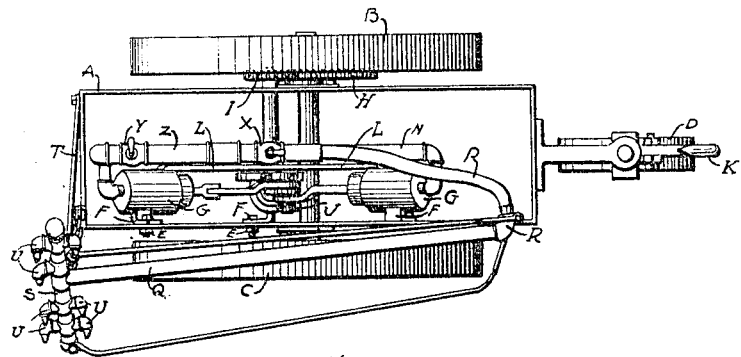
Fig. 4.
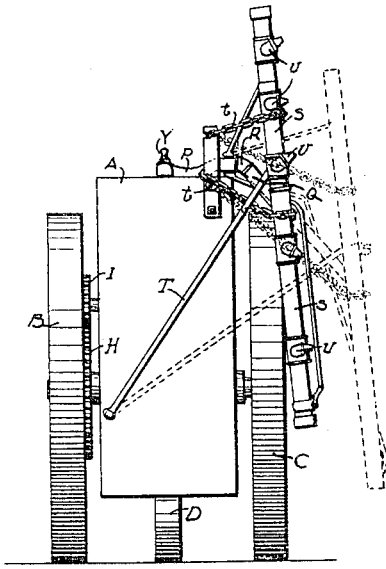
Fig. 5.
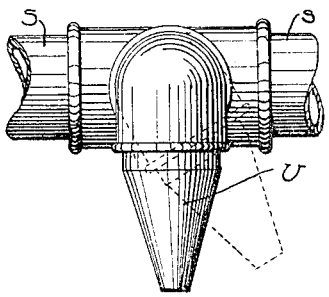
Fig. 6. George Roberts INVENTOR
WITNESSES:
BY
G. W. Bullard ATTORNEY

UNITED STATES PATENT OFFICE.

GEORGE ROBERTS, OF TACOMA, WASHINGTON, ASSIGNOR, BY DIRECT AND MESNE ASSIGNMENTS, TO HERMAN KLABER, OF TACOMA, WASHINGTON.

HOP-SPRAYER.

No. 804,675.     Specification of Letters Patent.     Patented Nov. 14, 1905.

Application filed October 16, 1903. Serial No. 177,343.

*To all whom it may concern:*

Be it known that I, GEORGE ROBERTS, a citizen of the Dominion of Canada, residing at 2923 Pacific avenue, in the city of Tacoma, in the county of Pierce and State of Washington, have invented certain new and useful Improvements in Hop-Sprayers, of which the following is a specification.

My invention pertains to devices or machines for spraying hops.

The objects of my invention are, first, to provide a machine that will successfully throw a fine spray of emulsion over hop-vines to destroy insects and lice with which they may be infected, and, second, to produce a machine that will force the emulsion through the sprayer under a constant and high pressure. I attain these objects by means of the mechanism illustrated in the accompanying drawings, in which—

Figure 1:
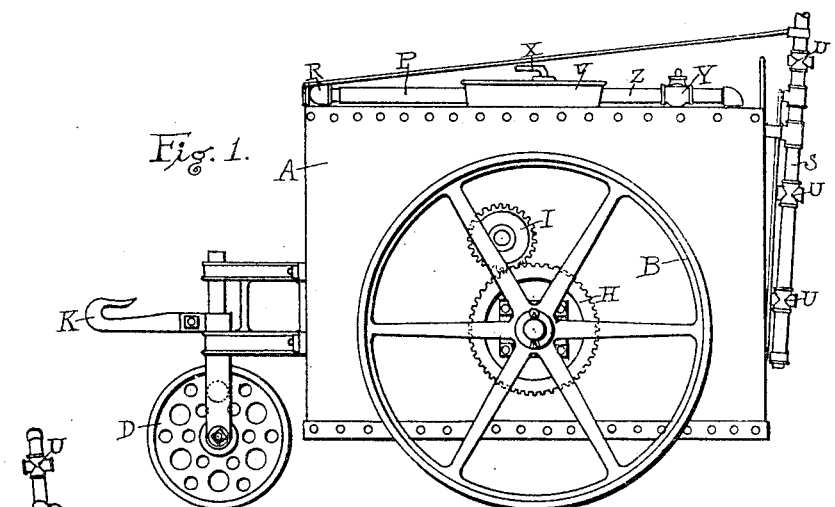
Figure 2:
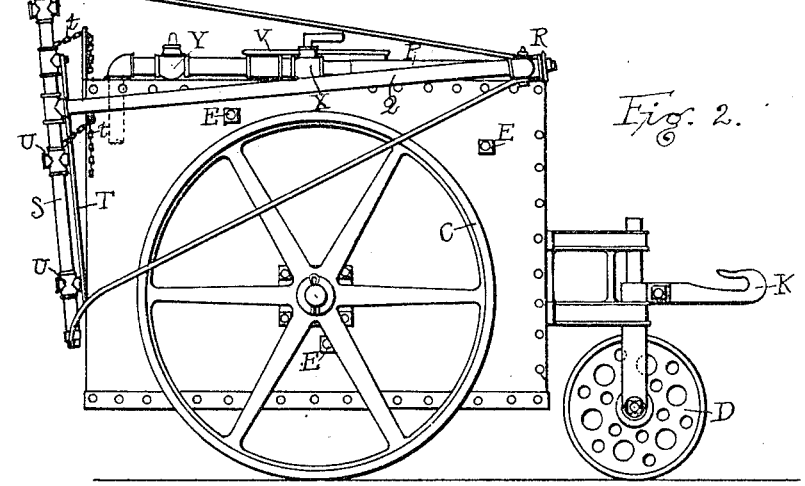
Figure 3:
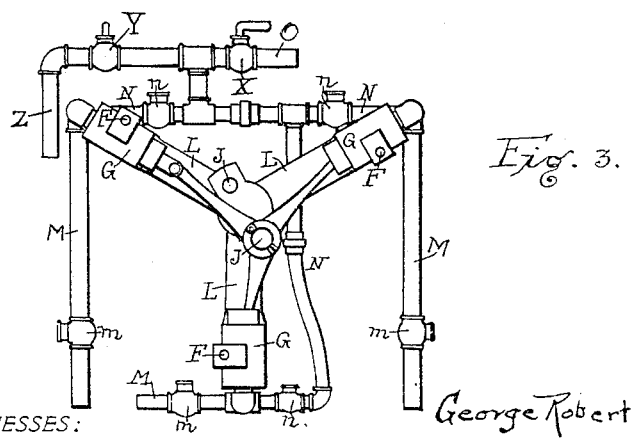

Figure 1 represents a left-side view of my spraying-machine. Fig. 2 is a right-side view of the same, and Fig. 3 is right-side view of the triplex pump located and operated within the emulsion-tank of the machine. Fig. 4 is a plan view of the machine. Fig. 5 is a rear end view. Fig. 6 is a detail of a part of the spray-pipe and one of its nozzles.

Similar letters refer to similar parts in the several views.

My invention consists of a box-shaped tank A, mounted on three wheels B, C, and D. Within the tank A is fixed a triplex pump. (Illustrated in Fig. 3.) This pump is bolted to the right-hand side of the tank with the bolts E E E, which pass through the holes F F F in the bracket-like extensions from the sides of each cylinder G G G of the triplex pump. The pump is operated by means of the gear H, mounted on the axle of the drive-wheels B and C and engaged with the pinion-gear I. The shaft of the gear I has its opposite end fixed in the crank J of the triplex pump and causes it to revolve and operate the pump. The sprayer is drawn by one or more horses hitched to the hook K and causes the pump to work.

It is to be observed the three cylinders G G G of the triplex pump are mounted on an equiangular three-armed frame L L L and are all held in a fixed position within the tank A by means of the bolts F F F previously mentioned. The three cylinders being thus mounted on an equiangular frame and each operated by one crank centrally mounted between them, one and one-third pumps will be in constant force as the crank turns round. The three pumps thus worked and all connected with one discharge-outlet will produce a constant and uniform pressure.

Each cylinder is provided with an intake-pipe M M M, each with its open end near the bottom of the tank A and each provided with a check-valve m m m. Each cylinder likewise has a discharge-pipe N N N, each provided with a check-valve n n n and all connected with one discharge-pipe O. This main discharge-pipe O is by means of a stout hose P connected with the sprayer-arm pipe Q, pivoted at R and connected with the sprayer-pipe S. This sprayer-pipe S is provided with a number of cross-outlet joints U, to which suitable sprayer-nozzles are designed to be attached to complete the mechanism of my sprayer. The sprayer-pipe S being mounted on the swinging upright arm T and adjustably anchored by the chains t t, the sprayer S may be swung in or out from the machine as necessity may require.

The tank A is filled with liquid emulsion through the opening V in the top. The machine is driven between the rows of vines in the hop-field, and the constant and high pressure from the pumps produces a fine spray that thoroughly covers the vines and destroys the insects thereon. It is to be observed that the sprayer may be put out of action when desired by closing the cut-off valve X and opening the relief-valve Y, which allows the liquid to be returned to the tank A through the pipe Z. By this means the sprayer may be put in and out of operation at pleasure. It is to be further observed that while my invention is designed principally for spraying hops, I do not limit myself to this use alone; but I design to use it for spraying other plants and trees, as occasion may require.

Having described my invention, what I claim as new, and desire to secure by Letters Patent, is—

1. In a hop-spraying machine, the combination with the tank, of equiangularly-disposed multiple pump-cylinders within the tank, an intake-pipe and a discharge-pipe for each cylinder, a pipe into which all the discharge-pipes deliver, a frame within the tank to which said pump-cylinders and their pipes are attached, the pump-cylinders being on one side of said frame and the pipes on the other side, means connecting the pump-cylinders to a side wall of the tank, a horizontally-disposed shaft within the tank, gears connecting said shaft with a driving-wheel of the machine, and a crank on the horizontally-arranged shaft centrally disposed in relation to the multiple cylinders and operatively connected with the expelling mechanism of the several cylinders of the pump, substantially as described.

2. In a hop-spraying machine the combination with the tank and the rotatable shaft passing through the same and rotated from the drive-wheel of the machine, of the plurality of pump-cylinders supported within the tank by a frame and bolted to the side of the tank, a crank actuated by said rotatable shaft and connected with the pistons of the plurality of cylinders, a check-valve-controlled intake-pipe to each cylinder in communication with the interior of the tank, a check-valve-controlled discharge-pipe to each cylinder, a pipe into which all of said cylinder-discharge-pipes deliver, a pivoted sprayer-arm pipe in communication with said delivery-pipe, a pipe provided with a number of sprayer-nozzles and carried by said sprayer-arm pipe, said sprayer-arm pipe and sprayer-nozzle pipe standing to one side of the tank, and means for sustaining said pipes at a greater or less distance from the side of the machine, substantially as described.

In testimony whereof I affix my signature in presence of two witnesses.

GEORGE ROBERTS.

Witnesses:
    H. F. NORRIS,
    I. H. HILL.